US010549948B2

(12) United States Patent
Sonnenmoser et al.

(10) Patent No.: US 10,549,948 B2
(45) Date of Patent: Feb. 4, 2020

(54) METHOD FOR OPERATING AN ELECTRONIC SAFETY SYSTEM WITH TEMPORARY PARTICIPANTS

(71) Applicant: Inventio AG, Hergiswil (CH)

(72) Inventors: Astrid Sonnenmoser, Hochdorf (CH); Ivo Lustenberger, Buttisholz (CH); Martin Hess, Baar (CH)

(73) Assignee: INVENTIO AG, Hergiswil NW (CH)

( * ) Notice: Subject to any disclaimer, the term of this patent is extended or adjusted under 35 U.S.C. 154(b) by 352 days.

(21) Appl. No.: 15/535,741

(22) PCT Filed: Dec. 15, 2015

(86) PCT No.: PCT/EP2015/079750
§ 371 (c)(1),
(2) Date: Jun. 14, 2017

(87) PCT Pub. No.: WO2016/096828
PCT Pub. Date: Jun. 23, 2016

(65) Prior Publication Data

US 2017/0349404 A1 Dec. 7, 2017

(30) Foreign Application Priority Data

Dec. 18, 2014 (EP) .................................... 14199060

(51) Int. Cl.

| | |
|---|---|
| ***B66B 1/28*** | (2006.01) |
| ***G05B 15/00*** | (2006.01) |
| ***B66B 5/00*** | (2006.01) |
| ***B66B 3/00*** | (2006.01) |
| ***B66B 5/02*** | (2006.01) |
| *B66B 9/00* | (2006.01) |

(52) U.S. Cl.
CPC .............. *B66B 5/0031* (2013.01); *B66B 1/28* (2013.01); *B66B 3/00* (2013.01); *B66B 5/02* (2013.01); *B66B 9/00* (2013.01)

(58) Field of Classification Search
CPC ........... B66B 5/0031; B66B 1/28; B66B 3/00; B66B 5/02; B66B 9/00
USPC ........................................................... 187/247
See application file for complete search history.

(56) References Cited

FOREIGN PATENT DOCUMENTS

| | | | |
|---|---|---|---|
| CN | 103068710 | A | 4/2013 |
| EP | 1159218 | A1 | 12/2001 |
| WO | 0051929 | | 9/2000 |
| WO | 2010097404 | A1 | 9/2010 |

(Continued)

*Primary Examiner* — Jeffrey Donels
(74) *Attorney, Agent, or Firm* — William J. Clemens; Shumaker, Loop & Kendrick, LLP

(57) ABSTRACT

A method for operating a safety system having a control unit, a bus, a plurality of bus nodes connected to the control unit via the bus and a plurality of participants connected to the control unit via the bus nodes, wherein at least one participant is designed as a temporary participant. The method involves the steps that the temporary participant is notified in the safety system by the temporary participant being connected at a bus node to the safety system via the bus, the temporary participants is recognized by the control unit, the temporary participant is integrated into the safety system by the control unit and the temporary participant is activated at least once. A further aspect of the invention relates to a safety system for an elevator system for carrying out the method and to an elevator system having the safety system.

18 Claims, 3 Drawing Sheets

(56) References Cited

FOREIGN PATENT DOCUMENTS

| | | | |
|---|---|---|---|
| WO | 2013020806 | A1 | 2/2013 |
| WO | 2014048826 | A1 | 4/2014 |

5a REFERENCE LIST

| ADD | ID1 | ID2 | Description | W | N |
|---|---|---|---|---|---|
| 41 | SS | AAA | Shaft door (61) floor 1 | A | A |
| 42 | SS | BBB | Shaft door (62) floor 2 | A | A |
| 43 | SS | CCC | Shaft door (63) floor 3 | A | A |
| 44 | TT | DDD | Cabin door (74) | A | A |
| 45 | UU | EEE | Safety brake(75) | A | A |
| 46 | VV | FFF | Emergency switch(76) | A | A |
| 47 | WW | GGG | Brake (87) | A | A |
| 48 | XX | HHH | Speed (88) | A | A |
| 49 | YY | III | Temporary participant (89) | A | I |

Fig. 2

METHOD FOR OPERATING AN ELECTRONIC SAFETY SYSTEM WITH TEMPORARY PARTICIPANTS

FIELD

The invention relates to a method for operating a safety system with temporary participants and a safety system that is provided for performing said method and an elevator system having said system.

BACKGROUND

Elevator systems are fitted with safety systems to ensure their safe operation. These safety systems typically consist of series-connected safety elements. These safety elements can, for example, monitor the status of shaft or car doors. Known systems for safety circuits are electromechanical or bus-based safety circuits. The reliable operation of such bus-based safety circuits is inspected on a regular basis. The design of and test procedures for such bus-based safety circuits are disclosed, for example, in EP 1159218 A1, WO 2010/097404 A1 or WO 2013/020806 A1. From this prior art however, it is not clear whether or to what extent the safety provision is ensured when connecting or disconnecting temporary participants, such as a manual control device for controlling the elevator system during maintenance work or an input device in which configuration settings of the safety system can be made.

SUMMARY

It is thus an object of the invention to specify a method or a safety system and an elevator system having such a safety system, with either of which it is possible to guarantee a safe connection between temporary participants and the safety system.

The safety system of the elevator system comprises a control unit, a bus, a plurality of bus nodes, which are connected to the control unit via the bus, and a plurality of participants, which are connected to the control unit via a bus node.

The term control unit is in this case understood as a unit that is provided with at least a microprocessor, a working memory and a fixed memory. Such a control unit is therefore designed to execute computer-aided programs. The control unit is configured as a safety control unit, which monitors the safety-relevant states of the elevator system and if an unsafe state occurs, restores the elevator system into a safe state again. This comprises, for example, the monitoring of the shaft door states, wherein the elevator system is shut down when a shaft door is open.

The term participants is in this case understood as sensors, switch contacts, control elements or actuators, which on one hand monitor a state of the elevator system and on another can exert influence on the safe operation of the elevator system. These include both position, speed or acceleration sensors, which monitor a motion state of an elevator car, and switching contacts, which monitor the state of a shaft door or car door or the bypassing of a specified end position by the elevator car. A safety system can also comprise control elements, via which the control commands for controlling the safety system or the elevator system, the configuration of the safety system or the choice of an operating mode can be entered, such as a control button, an entry screen or a manual control device. Actuators are defined as all components which can be activated by the control unit in order to restore an elevator system into a safe state after an impermissible state has been detected, and include such devices as a drive motor, a holding brake or a safety brake. The list of participants given above is only intended as an example and is not exhaustive.

The safety system can have at least one participant, which is designed as a temporary participant. A temporary participant is here defined as meaning a participant which is only temporarily connected to the safety system or the control unit via a bus node. Such temporary participants can be designed, for example, as control elements, place-holder elements or bridging elements, which are either connected or intended to be connected to the safety system only in a specific operating mode, such as a normal operating mode, a maintenance mode or a configuration mode.

The temporary participant is preferably registered in the safety system by A) the temporary participant being connected to the safety system at a bus node, B) the temporary participant being recognized by the control unit, C) the temporary participant being integrated into the safety system by the control unit, and D) the temporary participant being activated at least once.

Preferably, the control unit places the safety system in a fault mode if after connecting to the safety system the temporary participant is not activated before a specified period of time has elapsed, or if the temporary participant is disconnected from the safety system after the registration without further manipulation of the safety system. This ensures that the registration process of the temporary participant represents a deliberately executed action, and that, for example, an unintentional removal of the temporary participant cannot give rise to a dangerous state of the elevator system.

A fault mode is defined here as being a mode in which the elevator system can either not be operated at all, or can be operated only in a limited way. In the fault mode the elevator system is normally shut down, so that a potentially dangerous situation cannot occur at all. At most, in the fault mode one final journey of the elevator car to the nearest floor will be allowed, to avoid passengers being locked in the elevator car. The elevator system can then be put back into operation if the action which led to the fault mode has been rectified. Thus if, for example, the unintentionally removed temporary participant is registered in the safety system again.

Preferably, the temporary participant is registered in the safety system by the temporary participant being notified to the control unit before the connection by means of a manipulation of the safety system, wherein the notification can be effected by inputting a control command at a designated input point or by activating a switch. The input point or the switch are each connected to the safety system.

By means of the manipulation of the safety system, a state of expectation is created in the control unit that can be used for monitoring the registration procedure of a corresponding temporary participant.

Preferably, the control unit places the safety system in a fault mode if after the manipulation of the safety system, the temporary participant is not connected to the safety system before a specified period of time has elapsed, or if the temporary participant is connected to the safety system before the manipulation of the safety system occurs.

The detection or integration of the temporary participant is preferably confirmed by means of a display medium. In a simple manner, a confirmation is thus issued to a service engineer that the safety system is ready for a registration of the one-off activation of the temporary participant. The display medium can be designed, for example, as a display lamp that is integrated in the corresponding bus node.

A reference list of participants is preferably implemented on the control unit, which list at least contains data relating to an identification number of a participant. The temporary participant is recognized by the control unit if after a comparison of an identification number of the temporary participant with the identification numbers of the reference list, a match is found by the control unit.

The identification number is a number which can be used to identify a participant connected to the safety system, in particular this number can represent a unique identification number for each participant, or an identification number stating a type of the participant. The identification number can be stored on a storage medium of the participant. The reference list defines a set of expectations of the control unit as to which participants are to be connected to the safety system. Accordingly, for each participant that can be connected to the safety system there is an entry in the reference list. This entry comprises at least one identification number. If the temporary participant is connected to the safety system therefore, the control unit checks whether this participant or its identification number is included in the reference list. If this check proves positive, i.e. the identification number is included in the reference list, then the temporary participant is considered to be recognized.

The recognized temporary participant is preferably integrated in the reference list by the control unit by an entry of the recognized temporary participant being changed from an inactive to an active status by the control unit. This can be associated with a change of the operating mode. Thus an activation status for a temporary participant can be stored on the reference list of participants, wherein the participant adopts that status in a particular operating mode. This allows the control unit, immediately on recognizing the temporary participant, to automatically change into the operating mode that is stored as an active status in the entry of the temporary participant in the reference list.

An actual list of the participants is preferably implemented on the control unit, which represents an image of the participants connected to the safety system, and an operation of the elevator system is enabled only if during a comparison of the participants activated in the reference list against the participants entered in the actual list the control unit finds a match.

The actual list provides a list of all participants connected to the safety system at a particular point in time. All recognized participants are preferably listed in the actual list on the basis of their identification numbers. The comparison between the participants listed in the actual list with the participants stored in the reference list, in particular those that have an active status for a certain operating mode, is preferably made on the basis of the identification numbers contained in the two lists. Performing this comparison ensures that all participants intended for a specific operating mode are connected to the safety system before a corresponding operating mode is enabled.

Preferably, a temporary participant is recognized by the control unit by means of a first identification number representing a type of the temporary participant and/or by a second identification number enabling a unique identification of the temporary participant on the basis of a comparison of the first and/or second identification number of the temporary participant with the first and/or second identification numbers of the reference list.

For example, a plurality of manual control devices have the same first identification number, because these are devices of the same type. On the other hand, each manual control device has a unique second identification number assigned thereto.

A manual control device is defined here as a device for controlling the elevator system, which is operated by a service engineer during maintenance work. This manual control device preferably comprises four control elements, namely one button each for implementing a downwards or upwards directed travel, one button for triggering an emergency stop and one button for activating or deactivating the maintenance mode.

Preferably, the safety system is set into a fault mode by the control unit if more than one temporary participant with the same first identification number is connected to the safety system.

This allows a nonsensical combination of connected participants, which could cause a potentially dangerous situation, to be avoided. For example, an operation of the elevator system can be prevented if two manual control devices are connected to the safety system at the same time. A simultaneous connection of two manual devices could lead to an input conflict of control commands or even put the safety of a service engineer at risk.

Preferably, the safety system is enabled by the control unit for an operation if the control unit recognizes the second identification number of the temporary participant from a group of second identification numbers that are stored on the reference list.

In the reference list of a safety system or a control unit, a group of manual devices with corresponding second identification numbers could be stored, which are assigned to a defined group of service engineers. For this group of manual devices then, maintenance work on the elevator system is enabled. It could therefore be ensured that only a limited circle of service engineers, for example, members of a regional group of a company, can perform maintenance work on a corresponding elevator system. The trouble-free maintenance status of this elevator system can therefore be performed autonomously by the regional group responsible for it.

Preferably, in the event of a power failure a system status of the safety system is stored in a fixed memory of the control unit, in particular a reference list embodying a system status is stored.

On the restoration of the safety system after the power failure, the stored system state is preferably compared with the current system state by the control unit, in particular, the stored reference list is compared with an updated actual list. The safety system is placed in a fault mode by the control unit if, as a result of the comparison, the absence of a temporary participant in the actual list is detected.

This ensures that fault-inducing manipulations of the safety system during a power outage do not go unnoticed. The safety system can therefore determine, for example, if a manual control device was removed during the power outage, and by the stoppage of the elevator system prevents a possible automatic transition to a normal operating mode.

A further aspect of the invention relates to a device for carrying out the method and an elevator system having the said device.

DESCRIPTION OF THE DRAWINGS

The invention is described in further detail hereafter by reference to exemplary embodiments. Shown are:

FIG. 2 is an exemplary embodiment of a reference list which is implemented on the control unit of the safety system.

DETAILED DESCRIPTION

Figure 1:
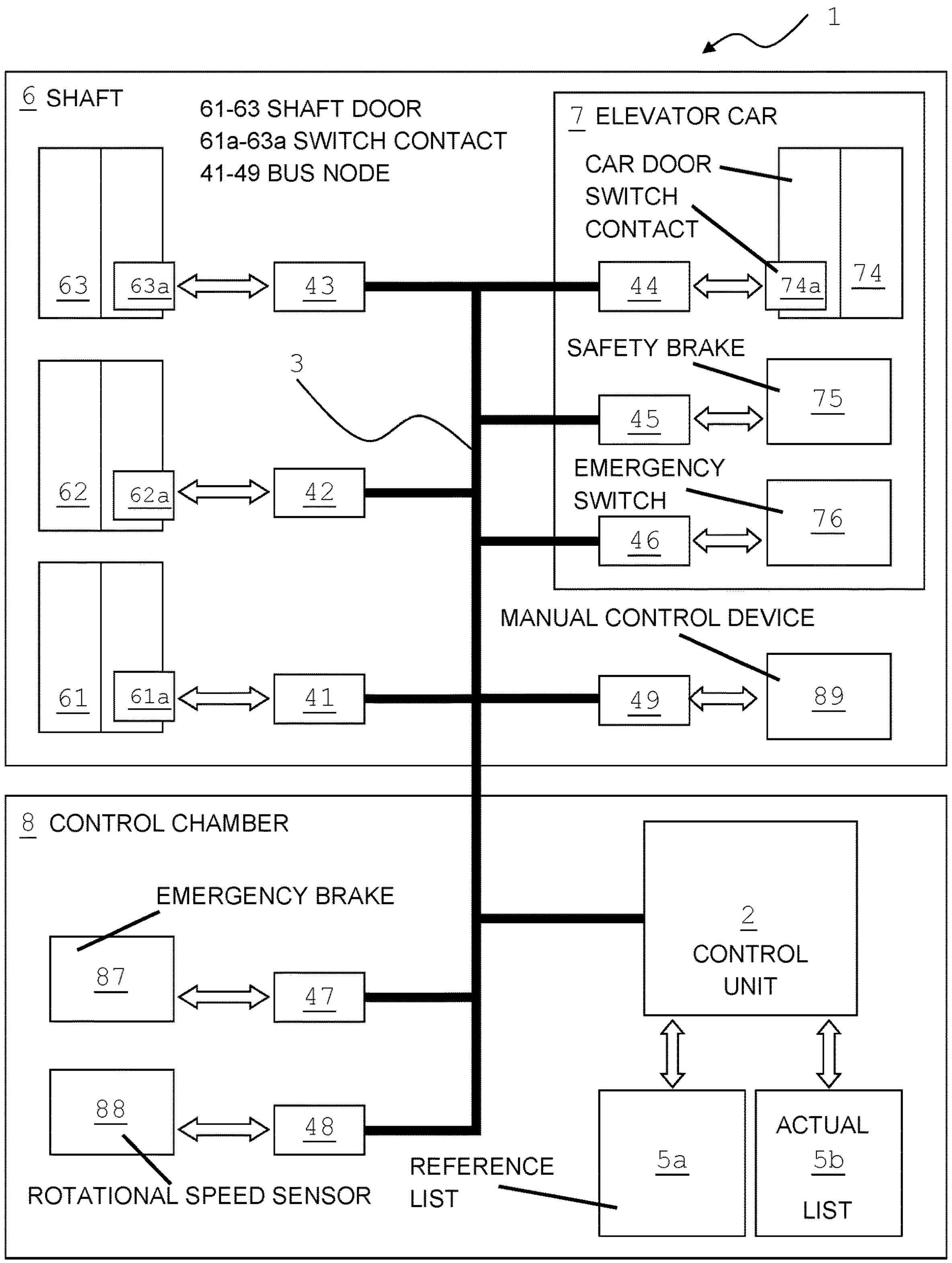
FIG. 1 is a schematic view of an exemplary arrangement of an elevator system according to the invention.

The elevator system 1 shown schematically in FIG. 1 comprises a control unit 2, which is connected via a bus 3 to a plurality of bus nodes 41 to 49. The control unit 2 can be arranged as shown in FIG. 1 in a separate control chamber 8. In a preferred embodiment, the control unit 2 can also be arranged in a shaft 6.

Reference number 6 schematically indicates a shaft 6 of a building, in which the elevator system 1 is installed. The example building comprises three floors, wherein each floor is equipped with a shaft door 61, 62 or 63. The shaft door 61 is assigned to bus node 41, shaft door 62 to bus node 42 and the shaft door 63 to bus node 43.

Each of the respective bus nodes 41, 42 or 43 is assigned one participant, in this example a switch contact 61*a*, 62*a*, 63*a*, which collects information relating to the status of the assigned shaft door 61, 62 or 63 (open, closed, locked), and if appropriate can generate a fault message for the control unit 2.

The elevator system 1 is also provided with an elevator car 7. The elevator car 7 is equipped with a car door 74, which is also assigned to a bus node 44. The bus node 44 is assigned a further participant, for example a switch contact 74*a*, which determines information relating to the status of the assigned car door 74 (open, closed, locked) and if appropriate can generate a fault message for the control unit 2.

The elevator system 1 can also be provided with a bus node 45 and a bus node 46, to which other participants are assigned, namely in each case a safety brake 75 arranged on the elevator car 7 and an emergency switch 76. The safety brake 75 is used for a safety braking of the elevator car 7, for example when the same reaches an excess speed. By activating the emergency stop switch 76 the elevator system 1 can be brought to an immediate standstill in an emergency situation.

In a control chamber 8 a drive unit is also arranged, which is equipped with two other participants, i.e. with an emergency brake 87 and with a rotational speed sensor 88, each of which is assigned to one bus node 47 and 48. In a preferred embodiment the drive unit can be arranged in the shaft 6, wherein a separate control chamber is eliminated.

In addition, a bus node 49 is provided, which is arranged in the area of the shaft 6 and is designed to accommodate a temporary participant, namely a manual control device 89. The bus node 49 can be arranged in particular on the roof of the car 7 or in the pit of the shaft 1 or near one of the doors 61-63, depending on the location on the elevator system 1 where maintenance work is to be carried out, which require the elevator car 7 to be moved. The temporary participant 89 is thus connected via the bus node 49 to the bus 3 or the control unit 2.

In the example shown, the temporary participant 89 can be connected to the bus 3 at a plug-in slot of the corresponding bus node 49. Alternatively, the temporary participant 89 can also be wirelessly connected to bus 3, for example via a WLAN, Bluetooth or via a different type of radio connection.

The manual control device 89 is designed to control the elevator system 1 or the elevator car 7 during a maintenance mode and comprises, for example, four control elements, namely one button each for implementing a downwards or upwards directed travel, one button for triggering an emergency stop and one switch for activating or deactivating a maintenance mode.

The control unit 2 is provided with a reference list 5*a*, which defines a set of expectations of the control unit 2. The reference list 5*a* comprises e.g. a list of which of the participants 61*a*-63*a*, 74*a*, 75, 76, 87, 88, 89 are to be connected to the bus 3 at a given time. In addition, the control unit 2 is provided with an actual list 5*b*, which represents a list of all participants 61*a*-63*a*, 74*a*, 75, 76, 87, 88, 89 that are currently connected to the bus 3.

By reference to FIG. 2, the reference list 5*a* will be explained in further detail. The reference list 5*a* comprises one entry for each participant contained therein. This entry corresponds to one row of the table. In a first column a bus address ADD of a bus node 41 to 49 is stored, to which the respective participant 61*a*-63*a*, 74*a*, 75, 76, 87, 88, 89 is connected. Via the bus address ADD the control unit 2 can communicate with a bus node 41 to 49, or with a participant 61*a*-63*a*, 74*a*, 75, 76, 87, 88, 89 connected thereto. Accordingly the control unit 2 can address, for example, control signals to a corresponding participant, for example to the safety brake 75 via the bus address ADD, 45 or selectively query states of the switching contact 61*a* on the bus address ADD, 41.

In a second column a first identification number ID1 of a participant 61*a*-63*a*, 74*a*, 75, 76, 87, 88, 89 is stored. This first identification number ID1 is dependent on the type of the participant. Thus the participants 61*a* to 63*b* all have the same initial consecutive identification number ID1 with the value SS, since all three participants are designed as switching contacts 61*a* to 63*a* of the same type, which monitor the state of an assigned shaft door 61 to 63. A safety brake 75 by contrast has an initial identification number ID1 different from this, with the value UU.

The participants can also be identifiable via a second identification number ID2. This second identification number ID2 provides for each participant 61*a*-63*a*, 74*a*, 75, 76, 87, 88, 89 e.g. a number AAA to JJJ, which enables a unique identification of each participant 61*a*-63*a*, 74*a*, 75, 76, 87, 88, 89.

Finally, an activation value of A or I is stored in the reference list 5*a* for each participant, wherein the activation value A represents an active status and the activation value I an inactive status of a participant. The reference list 5*a* shown comprises activation values A, I for each of two different operating modes of the elevator system 1, namely for a normal operating mode N and for a maintenance mode W. Thus, for example, in the entry for the temporary participant 89, or the manual control device, an activation value A is specified for a maintenance mode W and an activation value I for a normal operating mode. The manual control device 89 is thus assigned an active status in the maintenance mode W and an inactive status in the normal operation mode N.

Figure 3:
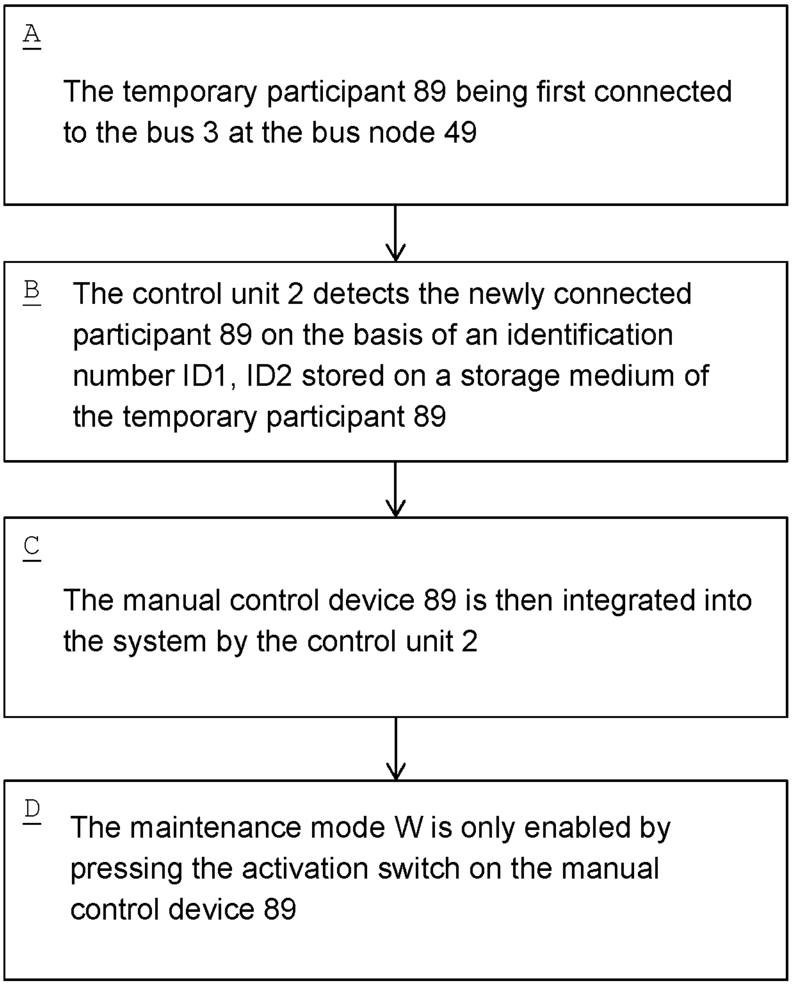
FIG. 3 is a flow diagram with an exemplary sequence of a registration procedure of a temporary participant on the safety system.

The temporary participant 89 is registered in the control unit 2 by in a first step A in accordance with FIG. 3 the temporary participant 89 being first connected to the bus 3 at the bus node 49. In a second step B, the control unit 2 detects the newly connected participant 89 on the basis of an identification number ID1, ID2 stored on a storage medium of the temporary participant 89. In the example shown, the first identification number ID1 indicates the type of temporary participant 89, i.e. that in this case it is a manual control device 89. The second identification number ID2 represents a unique identification number of the temporary participant 89. This means also that a plurality of manual control devices 89 can be distinguished or assigned to a maintenance engineer. Accordingly, for the entry of the manual control device 89 a plurality of second identification numbers ID2 can also be stored or alternatively, one entry each with a separate second identification number ID2 can be stored for different manual control devices 89.

In the example shown, an example of a first identification number ID1 with the value YY and a second identification number ID2 with the value III is stored for the manual control device 89. Thus if a manual control device 89 with corresponding identification numbers ID1 and ID2 is connected to the bus 3, the control unit 2 reads out the values YY and III for the identification numbers ID1 and ID2 stored on the storage medium of the temporary participant 89 and compares them with the values YY and III listed in the reference list 5*a*. In the event of a match the participant 89 is considered to be recognized.

Furthermore, in a third step C the manual control device 89 is then integrated into the system by the control unit 2, by the status of the manual control 89 in the entry in the reference list 5*a* being changed from inactive I to active A. This can be associated, for example, with an automatic change of the operating mode, namely from a normal operating mode N to a maintenance mode W. On the basis of the activation values A, I of the temporary participant that are stored in the reference list 5*a*, after recognizing the manual control device 89 the control unit 2 can automatically switch into the maintenance mode W. In addition, the control unit 2 can be programmed in such a way that in a fourth step D the maintenance mode W is only enabled by pressing the activation switch on the manual control device 89. After completion of the activation of the manual control device 89 this is considered to be integrated in the safety system.

The control unit 2 places the elevator system 2 in a fault mode if the activation of the temporary participant 89 after being plugged into the bus node 49 does not occur before a specified period of time has elapsed. The control unit also sets 2 the elevator system 2 in a fault mode if after the registration the temporary participant 89 is disconnected from the bus 3 without further manipulation of the safety system.

Optionally the reliability associated with the registration of the temporary participant 89 can be further increased if the temporary participant 89 is notified to the control unit 2 before the connection by means of a manipulation. The notification can be effected by inputting a control command at an input point designated for the purpose, which is either connected to the bus 3 via a bus node or else arranged directly on the control unit 2. A further possibility for notifying the connection involves the activation of a switch. This switch can also be connected to the bus 3 via a bus node or arranged directly on the control unit 2.

As a precaution, in this optional embodiment the control unit 2 can also place the elevator system 1 in a fault mode if after the manipulation the temporary participant 89 is not connected to the bus 3 before a specified period of time has elapsed. The control unit 2 can also place the elevator system 1 in a fault mode if the temporary participant 89 is connected to the bus 3 before the manipulation.

In a further embodiment it is also possible for the elevator system to be provided with a display medium. This display medium is designed to confirm the recognition or integration of the temporary participant 89. This confirmation indicates that the control unit 2 is ready for a registration of the one-off activation of the temporary participant 89. The display medium can for example be designed as a display lamp which is integrated in a corresponding bus node 41-49.

The control unit 2 is also designed to place the elevator system 1 into a fault mode if more than one temporary participant 89 with the same first identification number ID1 is connected to the bus 3. This can be used to prevent, for example, two manual control devices 89 from being simultaneously connected to the bus 3.

If the manual control device 89 has been recognized and integrated, it may realize the function assigned thereto, namely the control of the elevator system 1 during the maintenance mode W.

Also implemented on the control unit 2 is an actual list 5*b* of the participants 61*a*-63*a*, 74*a*, 75, 76, 87, 88, 89, which represents an image of the participants 61*a*-63*a*, 74*a*, 75, 76, 87, 88, 89 connected to the safety system 5*b* at a certain point in time. The actual list 5*b* is structured very similarly to the reference list 5*a* and essentially comprises the first four columns of the reference list 5*a*. The control unit 2 thus reads, for each available bus node 41 to 49, or their addresses ADD and the identification numbers ID1, ID2 of the participants 61*a*-63*a*, 74*a*, 75, 76, 87, 88, 89 connected to each bus node 41 to 49 into the actual list 5*b*. The operation of the elevator system 1 is only enabled by the control unit 2 if the control unit 2 finds a match during a comparison of the identification numbers ID1, ID2, in particular the identification numbers ID1, ID2 of the entries in the reference list 5*a* for which an active status is stored in a respective operating mode N, W, with those of the actual list 5*b*.

In the event of a power failure, the system status of the elevator system 1 is saved in a fixed memory of the control unit 2. In particular, the reference list 5*a* is saved on the fixed memory, since the reference list 5*a* represents such a system state. The reference list 5*a* contains all participants 61*a*-63*a*, 74*a*, 75, 76, 87, 88, 89 which should have an active status at a certain point in time.

In the event of a re-commissioning of the elevator system 1 after the power outage, the stored reference list 5*a* is used as a control list. In order to determine whether all temporary participants 89 present prior to the power outage are still connected to the bus 3, the stored reference list 5*a* is compared with the current actual list 5*b* after the power failure. If the control unit 2 detects the absence of a temporary participant 89 in the actual list as a result of the comparison, then the former places the elevator system 1 into a fault mode.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for operating a safety system of an elevator system having a control unit, a bus, a plurality of bus nodes connected to the control unit via the bus, a plurality of participant that are connected to the control unit via the bus nodes, and at least one temporary participant not connected to any of the bus nodes in the safety system, the method comprising the steps of:

A) connecting the at least one temporary participant to the safety system at one of the bus nodes;

B) recognizing the temporary participant by the control unit;

C) integrating the temporary participant into the safety system by the control unit; and D) activating the temporary participant at least once.

2. The method according to claim 1 wherein the control unit places the safety system in a fault mode if, after connecting to the safety system the at least one temporary participant is not activated before a specified period of time has elapsed, or if the at least one temporary participant is disconnected from the safety system after the registration without further manipulation of the safety system.

3. The method according to claim 1 wherein the at least one temporary participant is registered in the safety system by the at least one temporary participant being notified to the control unit, before the connection, by manipulation of the safety system.

4. The method according to claim 3 wherein the manipulation of the safety system is by input of a control command at a designated input point, or by the activation of a switch, wherein the input point or the switch are each connected to the safety system.

5. The method according to claim 3 wherein the control unit places the safety system in a fault mode if after the manipulation of the safety system, the at least one temporary participant is not connected to the safety system before a specified period of time has elapsed, or if the at least one temporary participant is connected to the safety system before the manipulation of the safety system.

6. The method according to claim 1 wherein the recognition and integration of the at least one temporary participant is confirmed by a display medium.

7. The method according to claim 1 including implementing on the control unit a reference list of the participants, the reference list containing at least data relating to an identification number of each of the participants, and wherein the at least one temporary participant is recognized by the control unit if a match is found by the control unit during a comparison of an identification number of the at least one temporary participant with one of the identification numbers of the reference list.

8. The method according to claim 7 wherein the recognized at least one temporary participant is integrated by the control unit by an entry of the recognized at least one temporary participant in the reference list being changed by the control unit from an inactive status to an active status.

9. The method according to claim 8 including implementing on the control unit an actual list of the ones of the participants connected to the safety system, and enabling an operation of the elevator system only if a match is found by the control unit during a comparison of the participants activated in the reference list with the participants entered in the actual list.

10. The method according to claim 7 including recognizing the at least one temporary participant by the control unit by at least one of a first identification number representing a type of the at least one temporary participant and a second identification number enabling a unique identification of the at least one temporary participant as a result of a comparison of the first or second identification number of the at least one temporary participant with first and second identification numbers of the reference list.

11. The method according to claim 10 wherein the safety system is placed in a fault mode by the control unit if more than one temporary participant with a same first identification number is connected to the safety system.

12. The method according to claim 10 wherein the safety system is enabled by the control unit for an operation if the control unit recognizes the second identification number of the at least one temporary participant from a group of second identification numbers stored on the reference list.

13. The method according to claim 1 wherein in an event of a power failure a system status of the safety system is saved in a fixed memory of the control unit.

14. The method according to claim 13 wherein a reference list of the participants embodying the system status is saved.

15. The method according to claim 13 wherein at a time of re-commissioning of the safety system after the power failure the saved system status is compared by the control unit with a current system status.

16. The method according to claim 15 wherein a reference list of the participants representing the saved system status is compared with an actual list of the participants representing the current system status, and the safety system is placed in a fault mode by the control unit if, as a result of the comparison, an absence of the at least one temporary participant in the actual list is detected.

17. A safety system for an elevator system comprising:

a control unit;

a bus;

a plurality of bus nodes connected to the control unit via the bus;

a plurality of participants, of which at least one participant is designed as a temporary participant, connected to the control unit via the bus nodes; and wherein the safety system is configured to implement the steps of, A) connecting the at least one temporary participant to the safety system at one of the bus nodes;

B) recognizing the temporary participant by the control unit;

C) integrating the temporary participant into the safety system by the control unit; and D) activating the temporary participant at least once.

18. An elevator system having the safety system according to claim 17 and wherein the control unit monitors safety-relevant states of the elevator system utilizing the participants and, if an unsafe state occurs, restores the elevator system into a safe state.

* * * * *